UNITED STATES PATENT OFFICE.

ALEX B. DAVIS, OF INDIANAPOLIS, INDIANA, ASSIGNOR TO THE ELI LILLY AND COMPANY, OF INDIANAPOLIS, INDIANA, A CORPORATION OF INDIANA.

ALKAMINS AND PROCESS OF PRODUCING SAME.

1,150,251.     Specification of Letters Patent.     Patented Aug. 17, 1915.

No Drawing.     Application filed May 21, 1914. Serial No. 840,106.

*To all whom it may concern:*

Be it known that I, ALEX B. DAVIS, a citizen of the United States, residing at Indianapolis, Marion county, and State of Indiana, have invented and discovered certain new and useful Improvements in Alkamins and Processes of Producing Same, of which the following is a specification.

This invention relates to new alkamins derived from new halogen tertiary alcohols. The alcohols are produced by the action of any organic magnesium haloids on a new dihalogen ketone.

The process in general is as follows: Chlor-methyl-w-brom-propyl carbinol (produced by condensing ethylene bromid with epichlorhydrin) is oxidized by means of potassium dichromate to chlor-methyl-w-brom-propyl ketone. This is allowed to react with magnesium alkyl haloids when chlor-tertiary carbinols are produced. These carbinols are condensed with substituted amins when the new alkamins result. The salts of their esters are valuable local anesthetics.

In detail, the process may be carried out as follows:—

*Step No. 1.*—48 parts by weight of magnesium metal in any suitable form, preferably turnings or wire are placed in a vessel connected to a reflux condenser and 400 parts of absolute ether added. 218 parts of ethyl bromid are run in slowly through the condenser, a reaction sets in and the metal dissolves to form a compound of the formula:

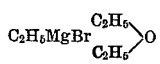

When all the magnesium has dissolved there are run in slowly, through the condenser, 199 parts of chlor-methyl-w-brom-propyl-ketone of the formula:

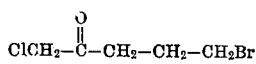

(produced by oxidizing chlor-methyl-omega-brom-propyl-carbinol, the reaction products of brom-ethyl-magnesium bromid and epichlorhydrin). A reaction takes place with liberation of much heat. When all the ketone has been added, the reaction mass is warmed on a water bath to 80° C., then poured on to cracked ice, run acid with dilute acid, the ethereal layer which rises to the top separated, the ether evaporated and the residue distilled in vacuum, when it boils at about 98° under 10 m.m. and has the constitution

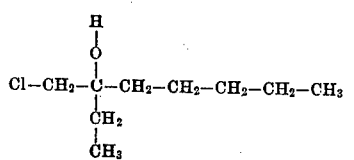

The reaction probably takes place as follows:

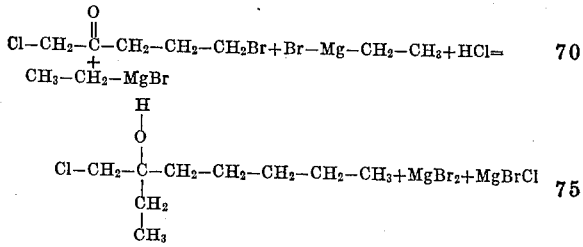

*Step No. 2.*—178 parts of the tertiary alcohol produced as above which may be called chlor-methyl-ethyl-amyl-carbinol are added to 350 c.c. of a 25% solution of dimethylamin (somewhat more than two molecular proportions) and the resulting mixture heated to 180° in an autoclave for three hours. It is then acidified with hydrochloric acid, the acid solution extracted twice with its own volume of ether to remove impurities, it is then evaporated to one half its original volume, cooled, covered with ether and made strongly alkaline with concentrated caustic soda solution, the alkali being added in sufficient quantity to liberate all the bases. This alkaline solution is extracted several times with ether, the ethereal extracts united, the ether and the excess dimethylamin evaporated and the residue distilled in vacuum when it comes over as colorless liquid boiling at about 96° under 15 m.m. and has the constitution

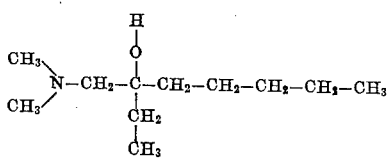

and which may be called dimethyl-amino-methyl-ethyl-amyl-carbinol. Some other amin than dimethyl amin may be used in Step 2 and some other halogen ester than ethyl bromid in Step 1 and the resulting compound might then be represented by the formula:—

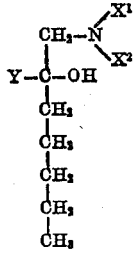

in which $X^1$ and $X^2$ are alkyl and hydrogen and Y, any monovalent group capable of being introduced by means of its organic magnesium haloids.

What I claim is:—

1. The process of producing alkamins by acting upon chlor-methyl-w-brom-propyl-ketone with alkyl magnesium haloids and condensing the resulting tertiary alcohols with substituted amins.

2. The process of producing dimethyl-amino methyl-ethyl-amyl carbinol by acting upon chlor-methyl-w-brom-propyl ketone with ethyl magnesium bromid and condensing the resulting tertiary alcohol with dimethyl amin.

3. Alkamins of the formula:—

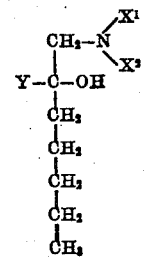

in which $X^1$ and $X^2$ are members of the group hydrogen and alkyl and Y a monovalent group capable of being introduced by means of its organic magnesium haloids.

4. An alkamin having the formula:—

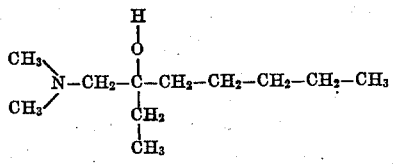

In witness whereof, I have hereunto set my hand and seal at Indianapolis, Indiana, this sixth day of May, A. D. nineteen hundred and fourteen.

ALEX B. DAVIS. [L. S.]

Witnesses:
E. G. EBERHARDT,
ARTHUR L. WALTERS.